US011743186B2

(12) United States Patent
Rousseau et al.

(10) Patent No.: US 11,743,186 B2
(45) Date of Patent: Aug. 29, 2023

(54) METHOD AND SYSTEM FOR HANDLING OF DATA PACKET/FRAMES USING AN ADAPTED BLOOM FILTER

(71) Applicant: OVH, Roubaix (FR)

(72) Inventors: Clement Rousseau, Plouguerneau (FR); Tristan Groleat, Brest (FR)

(73) Assignee: OVH, Roubaix (FR)

( * ) Notice: Subject to any disclaimer, the term of this patent is extended or adjusted under 35 U.S.C. 154(b) by 250 days.

(21) Appl. No.: 16/995,915

(22) Filed: Aug. 18, 2020

(65) Prior Publication Data

US 2021/0243123 A1 Aug. 5, 2021

(30) Foreign Application Priority Data

Jan. 30, 2020 (EP) .................................... 20315010

(51) Int. Cl.
*H04L 45/7453* (2022.01)
*H04L 43/106* (2022.01)
(Continued)

(52) U.S. Cl.
CPC .......... *H04L 45/7453* (2013.01); *G06F 11/08* (2013.01); *G06F 16/2255* (2019.01); *G06F 16/24532* (2019.01); *H04L 43/106* (2013.01); *H04L 45/7459* (2022.05); *H04L 49/901* (2013.01); *H04L 67/535* (2022.05)

(58) Field of Classification Search
CPC ............. H04L 45/7453; H04L 45/7459; H04L 67/535; H04L 43/106; H04L 49/901; G06F 16/2255; G06F 16/24532; G06F 11/08
See application file for complete search history.

(56) References Cited

U.S. PATENT DOCUMENTS 11,076,025 B1 * 7/2021 Volpe .................... H04L 43/106
2004/0054924 A1 3/2004 Chuah et al.
(Continued)

FOREIGN PATENT DOCUMENTS

CN 102253820 A 11/2011
CN 105429968 A 3/2016
(Continued)

OTHER PUBLICATIONS

European Search Report with regard to the EP Patent Application No. 20315010.7 completed Jul. 14, 2020.
(Continued)

*Primary Examiner* — Andre Tacdiran
*Assistant Examiner* — Christopher Nguyen
(74) *Attorney, Agent, or Firm* — BCF LLP

(57) ABSTRACT

A method and system are disclosed for handling a received content word in a system comprising a memory of memory words, wherein: each memory word comprises Bloom Filter structures. The method comprises hashing the content word into a fixed-size word, pointing to the memory word corresponding to an address of the fixed-size word, pointing to, and reading, the Bloom Filter structure in the pointed memory word corresponding to an address in the fixed-size word, and reading and writing the content of the Bloom Filter structures so as to keep track of a number of occurrences of the received content word over a sliding window of time.

12 Claims, 8 Drawing Sheets

(51) Int. Cl.
*H04L 49/901* (2022.01)
*G06F 16/22* (2019.01)
*G06F 11/08* (2006.01)
*H04L 67/50* (2022.01)
*G06F 16/2453* (2019.01)
*H04L 45/7459* (2022.01)

(56) References Cited

U.S. PATENT DOCUMENTS

2015/0039629 A1 2/2015 Theeten et al.
2022/0156280 A1* 5/2022 Nochlin .................. G06F 16/27

FOREIGN PATENT DOCUMENTS

CN 113315705 A * 8/2021 ........... H04L 45/745
EP 1562337 A1 8/2005

OTHER PUBLICATIONS

Jiansheng et al., "Detecting Duplicates over Sliding Windows with RAM-Efficient Detached Counting Bloom Filter Arrays", 2011 Sixth IEEE International Conference on Networking, Architecture, and Storage, 2011, pp. 382-391.
Dautrich et al., "Inferential Time-Decaying Bloom Filters", EDBT/ICDT, 2013, https://openproceedings.org/2013/conf/edbt/DautrichR13a.pdf, pp. 239-250.
Office Action and Search Report with regard to the counterpart CN Patent Application No. 2020109825077 dated Apr. 22, 2023.
English Abstract for CN 102253820 retreived on Espacenet on Apr. 25, 2023.
English Abstract for CN105429968 retreived on Espacenet on Apr. 25, 2023.

* cited by examiner

METHOD AND SYSTEM FOR HANDLING OF DATA PACKET/FRAMES USING AN ADAPTED BLOOM FILTER

CROSS-REFERENCE

The present application claims priority to European Patent Convention Application No. 20315010.7, entitled "Method and System for Handling Content of Data Packet/Frames Using an Adapted Bloom Filter," filed on Jan. 30, 2020, the entirety of which is incorporated herein by reference.

FIELD

The present technology relates to Bloom filters, more particularly an adapted Bloom filter for handling certain content of a data/packet frame.

BACKGROUND

In network environments, for two parties to communicate, is often required an initial process of negotiation between the two parties through the exchange of information to establish the protocols of a communication link, before actual communication may begin. What is known as "handshaking" is an example of such exchange of information often used in networking protocol environments, such as for example the Transmission Control Protocol (TCP) three-way handshake. This initial process of negotiation is standardized essentially through the requirements of data packet/frame contents exchanged between a sender and a receiver. In the aforementioned example of TCP, establishing a connection requires three separate steps, with each the sender and receiver verifying the adequacy hence the legitimacy of the data packet/frame received from the other party:
  the sender to send a particular data packet/frame (SYN) with its own sequence number x;
  the receiver to reply with a particular data packet/frame (SYN-ACK) with its own sequence number y and acknowledgement number x+1; and
  the sender to reply with a particular data packet/frame (ACK) with acknowledgement number y+1.

When a received content for a data packet/frame is not as expected (for example: out of sequence numbering, or no reply received within a given time period), retries are attempted to re-send the particular data packet/frame which should have been replied to with another particular data packet/frame.

Other networking protocols, such as, without limitation, User Datagram Protocol (UDP), do not provide «handshaking» per se, however when a sender, such as a client, sends a UDP data packet/frame to a receiver, such as a server, it may expect, depending on the data packet/frame content, a given reply from the receiver. In such a case, if no reply is received, the sender may typically retry sending the initial data packet/frame.

In both environments (handshaking or not), there is the common requirement for a communicating party, to keep track of a number of attempts and retries over a sliding window of time. The requirement is all the more demanding, in terms of storage and processing speed, that the party is simultaneously communicating, or attempting to communicate, with a larger number of other parties (such as a client simultaneously communicating, or attempting to communicate, with many servers, or vice-versa, a server with many clients).

In the context of data centers and cloud infrastructure that integrate many servers and provide mutualized hosting services to large numbers of clients, the two aforementioned communicating parties may be a server hosted in a datacenter as a resource to serve multiple clients, and a remote client. In this context, have been developed Denial of Service (DoS) types of cyberattacks having, as an object to disrupt the proper functioning of such a server by exploiting the weaknesses of networking protocols (whether involving handshaking or not), and as an aim to consume the computing resources of the server so that it is not capable anymore to properly serve legitimate clients. In the TCP example above, the attack may for example consist in a rogue client sending a SYN data packet/frame (or many) that is not fully legitimate and that the server consumes resources in analyzing and deciding how to handle, or not timely replying an ACK data packet/frame so that the server consumes resources in waiting for, or in re-sending one or several SYN-ACK data packet/frames, etc.

The gravity of the cyberattack for the server may be largely increased by having large numbers of remote clients having the same behaviour, and flooding the server with malicious data packet/frames in the aforementioned context of networking protocols, so that it may consume resources with handling such malicious data packet/frames, and become inoperable with other legitimate remote clients. As a result, data centers and cloud infrastructure have been equipped with networking pieces of equipment, installed between the servers populating such data centers and cloud infrastructure, and remote clients, with a risk mitigation function for the data traffic. Examples of such networking pieces of equipment include firewalls, switches, routers, and other dedicated security risk mitigation networking piece of equipment.

One aspect of such mitigation function involves monitoring the received or intercepted data traffic to detect suspicious patterns of data packet/frames' content, sequencing and/or timeliness as part of a networking protocol. This monitoring requires the capability on the part of mitigation networking pieces of equipment, to both decide whether a particular address in a received or intercepted data packet/frame belongs or not to a group of addresses (for example known as fraudulent or illegitimate), and memorize data packet/frames over periods of time depending on the networking protocol.

In both environments of a party communicating through a networking protocol, or of a mitigation networking piece of equipment, the requirements for monitoring exchanged data packet/frames in terms of storage and processing speed are extremely high, given in particular the number of communications to monitor, and/or the speed at which this monitoring has to occur. Yet equipment involved has typically had hardware limitations through the physical characteristics of the processor and memory implemented in the equipment. Thus, computing techniques have been developed to both reduce memory requirements and processing time based on a so-called "Bloom filter". As is known to the person skilled in the art, a Bloom filter is a space-efficient probabilistic data structure, that may be used to test whether an element, such as an address in a data packet/frame, is a member of a set. Such technique allows to know with certainty that an element is not part of a set, or with a certain probability, that it may be present in the set. Variants of Bloom filters have been developed that include time-decaying and counting Bloom filters.

However, a combined time-decaying and counting Bloom filter is still desirable for processing-efficient implementation of a method or system for handling content of data packet/frames, in particular keeping track of a number of attempts and retries of sending or receiving such data packet/frames over a sliding window of time.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

In one embodiment, various implementations of the present technology provide a method for handling a content word in a system comprising i (i>=1) memories of $2^N$ memory words of R bits each, and wherein:

- each memory word comprises at least $2^S$ Bloom Filter (BF) structures;
- each BF structure comprises Floor($R/2^S$) bits of which P bits define a Flags field, M bits define a Timestamp field, Q bits define a Counter field, such that P+M+Q=Floor($R/2^S$) and P is a power of 2; and
- an absolute time value has increments of time units, and a current time value is the absolute time value modulo $2^M$;

The method comprises:
a) receiving the content word;
b) hashing the content word into i fixed-size words, each comprising 3 fields $A_i$, $B_i$, $C_i$, of respectively N, S and square root(P) bits;
c) pointing to i memory words, corresponding respectively to A;
d) pointing to, and reading, i BF structures respectively in the i pointed memory words, corresponding respectively to B;
e) checking whether all i pointed and read BF structures have a valid Timestamp field, and if not:
  for BF structures among the i pointed and read BF structures having an invalid Timestamp field: writing a "1" in a bit of the Flags field corresponding to $C_i$, writing a "0" in all other bits of the Flags field, and resetting to "0" the Counter field; and for BF structures among the i pointed and read BF structures having a valid Timestamp field: writing a "1" in a bit of the Flags field corresponding to $C_i$; and
  for all BF structures among the i pointed and read BF structures: updating the Timestamp field with the current time value, and going to step a);
f) checking whether all bits of the Flags field in all i pointed and read BF structures are at "1", and if not: writing a "1" in the bit of the Flags field corresponding to $C_i$; and
  for all BF structures among the i pointed and read BF structures: updating the Timestamp field with the current time value, and going to step a);
g) checking whether all bits in Counter fields in all i pointed and read BF structures are at "1", and if not:
  for BF structures among the i pointed and read BF structures having a Counter field equal to the Min of Counter fields in the i pointed and read BF structures: incrementing by one the value of the Counter field; and
  for all BF structures among the i pointed and read BF structures: updating the Timestamp field with the current time value, and going to step a); and
h) for all BF structures among the i pointed and read BF structures: updating the Timestamp field with the current time value, and going to step a).

In another embodiment, the method further comprises re-initializing all the BF structures in all memory words of at least one of the i memories, including reading all the BF structures in all memory words of at least one of the i memories, and for each such read BF structure, checking whether the content of the Timestamp field is valid, and if not: writing a "0" in all bits of the Flags field; resetting to "0" the Counter field; and updating the Timestamp field with the current time value.

In another embodiment of the method, the content word is a concatenation of addresses including Internet Protocol source and destination addresses.

In yet another embodiment of the method, each BF structure comprises 4 bits for the Flags field, 4 bits for the Timestamp field, and 1 bit for the Counter field.

In yet another embodiment of the method, a Timestamp field is valid when the absolute value of the difference between the value of the Timestamp field and the current time value is less than a predetermined value.

In yet another embodiment of the method, the predetermined value is $2^{(M-1)}$.

In yet another embodiment of the method, the re-initializing all the BF structures in all memory words of at least one of the i memories is performed at a period of time equal or less than $2^{(M-1)}$ time units.

In yet another embodiment of the method, i is >=3 and at least two of the i fixed-size words are identical.

In another embodiment, various implementations of the present technology provide a system for handling a content word comprising i (i>=1) memories of $2^N$ memory words of R bits each, wherein:

- each memory word comprises at least $2^S$ BF structures;
- each BF structure comprises Floor($R/2^S$) bits of which P bits define a Flags field, M bits define a Timestamp field, Q bits define a Counter field, such that P+M+Q=Floor($R/2^S$) and P is a power of 2; and
- an absolute time value has increments of time units, and a current time value is the absolute time value modulo $2^M$;

the system is configured to:
receive the content word;
hash the content word into i fixed-size words (104, 704, 714), each comprising 3 fields $A_i$, $B_i$, $C_i$, of respectively N, S and square root(P) bits;
point to i memory words, corresponding respectively to A;
point to, and read, i BF structures respectively in the i pointed memory words, corresponding respectively to B;
check whether all i pointed and read BF structures have a valid Timestamp field, and if not:
  for BF structures among the i pointed and read BF structures having an invalid Timestamp field: write a "1" in a bit of the Flags field corresponding to $C_i$, write a "0" in all other bits of the Flags field, and reset to "0" the Counter field; and for BF structures among the i pointed and read BF structures having a valid Timestamp field: write a "1" in a bit of the Flags field corresponding to $C_i$; and for all BF structures among the i pointed and read BF structures: update the Timestamp field with the current time value;

check whether all bits of the Flags field in all i pointed and read BF structures are at "1", and if not:

write a "1" in the bit of the Flags field corresponding to $C_i$; and for all BF structures among the i pointed and read BF structures: update the Timestamp field with the current time value;

check whether all bits in Counter fields in all i pointed and read BF structures are at "1", and if not:

for BF structures among the i pointed and read BF structures having a Counter field equal to the Min of Counter fields in the i pointed and read BF structures: increment by one the value of the Counter field; and for all BF structures among the i pointed and read BF structures: update the Timestamp field with the current time value.

In a further embodiment, the system is further configured to read all the BF structures in all memory words of at least one of the i memories, and for each such read BF structure, check whether the content of the Timestamp field is valid, and if not: write a "0" in all bits of the Flags field; reset to "0" the Counter field; and update the Timestamp field with the current time value.

In yet a further embodiment of the system, the content word is a portion of a data packet/frame exchanged between two communicating devices, and is intercepted so as to determine whether an identical content word has been exchanged between the two communicating devices over a sliding window of absolute time.

In yet a further embodiment of the system, the i memories are Quad Data Rate SRAMs.

In the context of the present description, unless expressly provided otherwise, a computing system, may refer, but is not limited to, an "electronic device", an "operation system", a "system", a "computer-based system", a "controller unit", a "monitoring device", a "control device" and/or any combination thereof appropriate to the relevant task at hand.

In the context of the present specification, the expression "FPGA" is intended to include Field Programmable Gate Array computing systems, available on the market at the time of filing this patent application, such as references Xilinx VU9P, or Intel Stratix V, and any subsequent equivalent technologies becoming available, regardless of their name, consisting in computing system hardware programmable with software.

In the context of the present description, the expression "processor" in intended to include a single dedicated processor, a single shared processor, or a plurality of individual processors, some of which may be shared. In some aspects of the present technology, the processor may be for example a general purpose processor, such as a central processing unit (CPU), a processor dedicated to a specific purpose, or a processor implemented in a FPGA. Other hardware, conventional and/or custom, may also be included.

In the context of the present description, unless expressly provided otherwise, the expression "memory" is intended to include Random Access storage systems, available on the market at the time of filing this patent application, and any subsequent equivalent technologies becoming available, regardless of their name, consisting in computing system media for storing digital information. An example of such memory may be a Quad Data Rate (QDR) Static Random Access Memory (SRAM).

In the context of the present description, the functional steps shown in the figures, may be provided through the use of dedicated hardware, as well as hardware capable of executing software in association with appropriate software.

Still in the context of the present description, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present description, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale. Further, elements that are identical from one figure to the next share the same reference numerals.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

Figure 1:
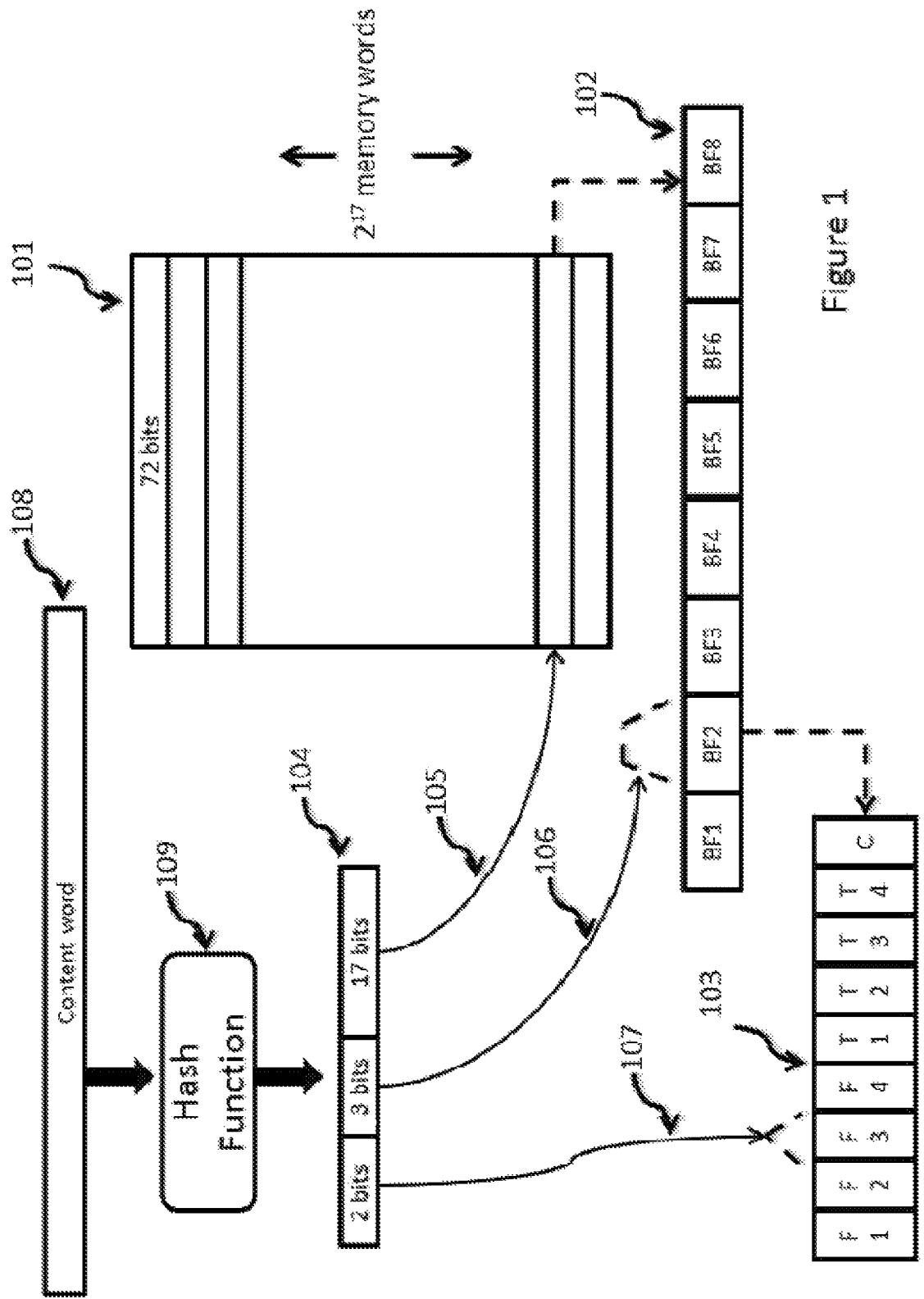
FIG. 1 depicts an example of implementation of an adapted Bloom filter according to the present technology.

FIG. 1 depicts an example of implementation of an adapted Bloom filter according to the present technology. A content word 108 is to be handled, in particular without limitation in the case where such content word 108 represents certain content of a received or intercepted data packet/frame, in order to determine whether an identical content has been handled in a recent period of time. For example, the content word 108 may be a content portion of a data packet/frame exchanged between a sender and a receiver over a networking protocol, and analyzed by the receiver, or exchanged between two communicating parties over a networking protocol and intercepted by a mitigation networking piece of equipment.

For example also, the content word 108 may be a concatenation of such communicating party/sender's IP source and destination addresses, together with TCP destination port. For example, the content word 108 may comprise 32+32+16=80 bits. A hash function 109 may be used, as is known to the person skilled in the art, to map the content word 108 into a fixed-size word 104 that may be used for indexing purposes.

Taking advantage of a memory 101 comprising as an example $2^{17}$ words of 72 bits each, the fixed-size word 104 may be optimized, from a hardware limitation perspective, to include:

- 17 bits pointing (105) to one of the $2^{17}$ words of the memory 101;
- 3 bits pointing (106) to one (example as shown FIG. 1: BF2) of 8 Bloom filter structures in a memory word 102 of the memory 101; and
- 2 bits pointing (107) to one (example as shown FIG. 1: F3) of 4 bits F1-F4 of a Flags field (as explained below) in a Bloom filter structure 103. For example, the values of the 2 bits may point to the bits F1-F4 as follows:

| Value of 2-bit field | Bit pointed to in the Flags field |
| --- | --- |
| 00 | F1 |
| 01 | F2 |
| 10 | F3 |
| 11 | F4 |

It will be apparent to the person skilled in the art that, in particular depending on the size (width and length) of the memory 101, other sizes and composition of the fixed-size word 104 may be adapted and optimized, without affecting the generality of the teachings herein.

Figure 2:
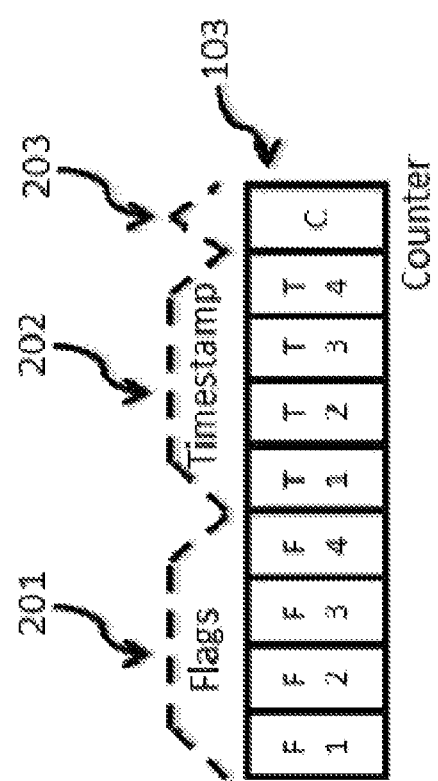
FIG. 2 depicts an example of adapted Bloom filter structure according to the present technology.

FIG. 2 depicts an example of adapted Bloom filter structure according to the present technology. The Bloom filter structure 103 may include:

- 4-bit Flags 201, for example labelled respectively F1 to F4;
- 4-bit Timestamp 202, for example labelled respectively T1 to T4; and
- 1-bit Counter 203, for example labelled C.

This structure, used with the read/write sequences explained below when a received or intercepted content word 108 is to be handled, constitutes an adapted Bloom filter that combines time-decaying with counting features that is desirable, for example for processing-efficient implementation of a method or system for handling data packet/frames by keeping track of a number of attempts and retries of sending or receiving such data packet/frames over a sliding window of time. It will be apparent to the person skilled in the art that the size and composition of the Bloom filter structure 103 may be adapted and optimized, without affecting the generality of the teachings herein, depending on a number of factors, including in particular and without limitation: the size (width and length) of the memory 101, the size of the content word 108, the maximum acceptable rate of false positives, the maximum number of occurrences of the same content word 108 over a sliding window of time (for example, as a number of retries under a particular networking protocol), and/or the maximum number of different content words 108 that are to be monitored simultaneously.

For example:

the Counter 203 may comprise more than one bit depending on the number of retries of content word 108 which is to be monitored in a sliding window of time: for example 2 bits in the environment of a networking protocol where 5 retries are possible;

the number of bits of Timestamp 202 may be adapted for example to accommodate the time it takes, essentially hardware-limited, to re-initialize the memory 101 according to the process described below in relation to FIG. 4, or to opt for a specific granularity of "absolute" time afforded by one Timestamp unit; and/or the number of bits of Flags 201 may be adapted as an optimization between the maximum number of different content words 108 that are to be monitored simultaneously, and maximum occupancy of the memory 101 by adopting a BF structure with a number of bits that is a divider of the width of a word in the memory 101 (for example, as shown FIG. 1: 9-bit BF structure for a 72-bit width of words in the memory 101).

Figure 3:
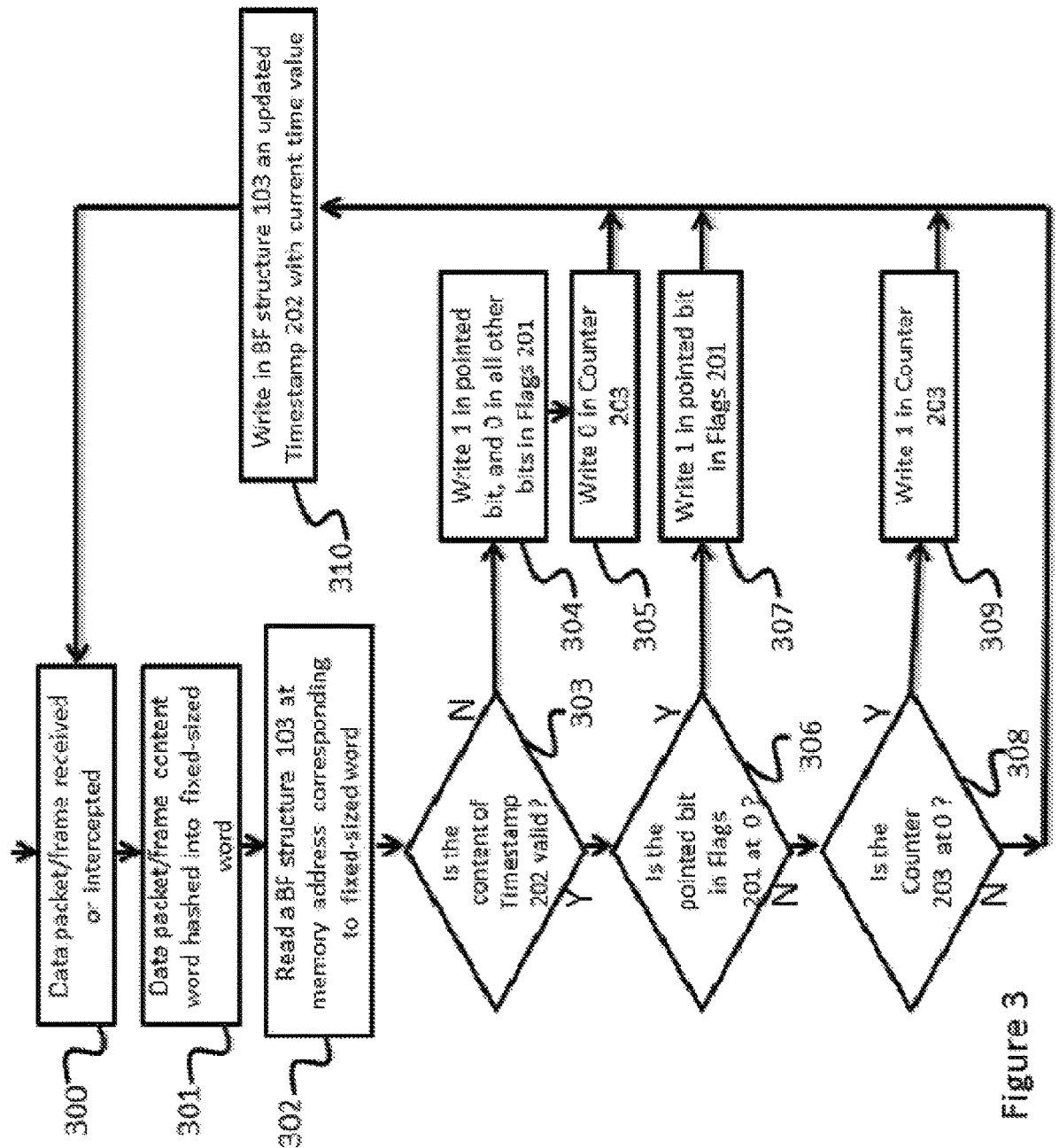
FIG. 3 depicts an application of the adapted Bloom filter structure according to the present technology, to the analysis of certain content of a data packet/frame either received or intercepted.

FIG. 3 depicts an application of the adapted Bloom filter according to the present technology, to the analysis of certain content of a data packet/frame either received or intercepted. The application may take the form of a method with steps 300 to 310. At step 300, a data packet/frame may be received or intercepted. At step 301, a content word of the data packet/frame may be hashed into a fixed size word, such as for example the 22-bit fixed size word 104 described above. At step 302, the fixed size word may be used to point to, and read/write, a BF structure, such as for example the BF structure 103 described above, in a memory such as for example the memory 101 previously mentioned.

Once a BF structure is being recovered from the memory, a number of read/write operations may occur on that BF structure as follows. Numbering refers as an example to the numbered fields in the BF structure depicted FIG. 2:

at step 303, the content of Timestamp field 202 may be checked:
  if its content is "invalid", with that notion being more precisely defined below, at step 304 a "1" may be written in the pointed bit in the Flags field 201, such as the bit F3 described above, and a "0" may be written in all other bits of the Flags field 201 (so that, since the content of Timestamp field 202 is invalid, there is no opportunity to consider any part of the Flags field 201, other than the lastly pointed bit, as being valid), at step 305 a "0" may be written in all bits of the Counter field 203 (ie: Counter field 203 may be reset to 0), at step 310, the current time value (it will be apparent to the person in the art that that this current time value will be an "absolute" time value modulo 2 to the power of the number of bits of Timestamp field 202) may be written in Timestamp 202, and a next data packet/frame may be awaited at step 300. This case corresponds to a content of the BF structure that is invalid, therefore the first occurrence of the fixed-size word obtained at step 301;
  if at step 303, the Timestamp content is "valid", the pointed bit in the Flags field 201 may be checked at step 306:
    if the pointed bit in the Flags field 201 has a value of "0", then at step 307, a "1" may be written in the pointed bit in the Flags field 201, the current time value ("absolute" time value modulo 2 to the power of the number of bits of Timestamp field 202) may be written in Timestamp 202 at step 310, and a next data packet/frame may be awaited at step 300. This case corresponds to a content of the BF structure that is valid, and the first occurrence of the fixed-size word obtained at step 301;
    if at step 306, the pointed bit in the Flags field 201 has a value of "1", then at step 308, the content of Counter 203 may be checked:
      if the Counter 203 has a value of "0", then at step 309 its value may be set to "1", the current time value ("absolute" time value modulo 2 to the power of the number of bits of Timestamp field 202) may be written in Timestamp 202 at step 310, and a next data packet/frame may be awaited at step 300. This case corresponds to a content of the BF structure that is valid, and the second occurrence of the fixed-size word obtained at step 301;
      if at step 308, the Counter 203 has a value of "1", then the current time value ("absolute" time value modulo 2 to the power of the number of bits of Timestamp field 202) may be written in Timestamp 202 at step 310, and a next data packet/frame may be awaited at step 300. This case corresponds to a content of the BF structure that is valid, and the third or subsequent occurrence of the fixed-size word obtained at step 301.

It will be apparent to the person skilled in the art that if the Counter 203 comprises more than one bit, steps 308 and 309 may be adapted to check a number of occurrences beyond two of the same content word 108. For example step 309 may consist in an increment of Counter 203, instead of writing a "1" as shown on FIG. 3.

It will be equally apparent to the person skilled in the art, that the checking steps 303, 306, 308 are represented as sequential on FIG. 3 only for convenience of the description, and that such checking steps may be performed in parallel.

The adapted BF structure 103 according to the present technology thus may allow in one of its possible applications as described herein, to keep track of a number of attempts and retries of sending or receiving data packet/frames with particular content. In order that such tracking may be performed over a sliding window of time, a period of time relative to the current time value may be defined during which content in the Timestamp 202 is considered valid, and above which such content is considered invalid. This period of time may be defined by the number of bits of the Timestamp 202. M bits for the Timestamp 202 allow to count up to $2^M$ time units, before the Timestamp 202, as a time counter, revolves around itself. For example, the Timestamp 202 may comprise 4 bits, as depicted FIG. 2, allowing to count up to 16 time units. Content of the Timestamp 202 may for example be considered valid for $2^{(M-1)}$ time units. In this context, if the absolute value of the difference between the value of the Timestamp 202 and the current time value ("absolute" time value modulo $2^M$) exceeds $2^{(M-1)}$, then content of the Timestamp 202 may be considered invalid. For example if the "absolute" time value is 3498, the current time value is 3498 modulo 16=10, then:
  if the value of Timestamp 202, as checked at step 303 in FIG. 3, is 5, then content of the Timestamp 202 may be considered valid;
  if the value of Timestamp 202 is 1, then content of the Timestamp 202 may be considered invalid.

It will be apparent to the person skilled in the art that a period of time relative to the current time value, and characterizing the validity of content of Timestamp 202, may be defined as other than $2^{(M-1)}$ time units without departing from the scope of the present technology.

As will also be appreciated by the person skilled in the art, a time unit's duration will be decided depending on a number of factors, including the particulars of the application of the present technology, or as afforded by the clock cycle of the computing system in which the adapted BF structure may be implemented. For example, a time unit may be one second.

In the general case, a number of parameters and their interrelation may be defined for the adapted BF structure and its usage according to the present technology. The memory (101) may comprise $2^N$ (N=17 in the example of FIG. 1) memory words (102) of R bits each (R=72 in the example), and each memory word (102) may comprise $2^S$ BF structures (103) (S=3 in the example). Each BF structure (103) may comprise a number of bits which may be: Floor(R/$2^S$) (=9 in the example), of which P bits define the Flags field (201), M bits define the Timestamp field (202), and Q bits define the Counter field (203). The constraint on parameters is that P+M+Q=Floor(R/$2^S$), and P be a power of 2 (P=4, M=4, Q=1 in the example). The fixed-size word (104) comprises 3 fields of respectively N(=17 in the example), S(=3) and square root(P) (=2) bits.

Since a checking at step 303 on FIG. 3 of the validity of content of Timestamp 202 occurs only upon receiving or intercepting a data packet/frame (step 300 on FIG. 3), an optional parallel process may be implemented according to the present technology which checks the validity of content of Timestamp 202 on a regular basis regardless of the receipt or intercepting of a data packet/frame. This optional process may involve a complete re-initialization of the content of memory 101 on FIG. 1 at regular intervals as depicted on FIG. 4. This re-initialization process may take place at a period of time of $2^{(M-1)}-1$ time units, for example when content of the Timestamp 202 may be considered valid for $2^{(M-1)}$ time units. However, it will be apparent to the person skilled in the art that other periods of time may be adopted depending in particular on the speed of access and update of memory 101 afforded by the processing environment in which the adapted Bloom filter structures may be implemented. It will also be apparent to the person skilled in the art that the decision to implement or not the optional parallel re-initialization process may be driven by the number of bits of the Timestamp field 202 against acceptability for particular applications of the method and system according to FIG. 3, of the risk that the Timestamp 202 be decided valid at step 303, even though the time counting it affords already revolved around itself once or several times since the previous checking of step 303.

Figure 4:
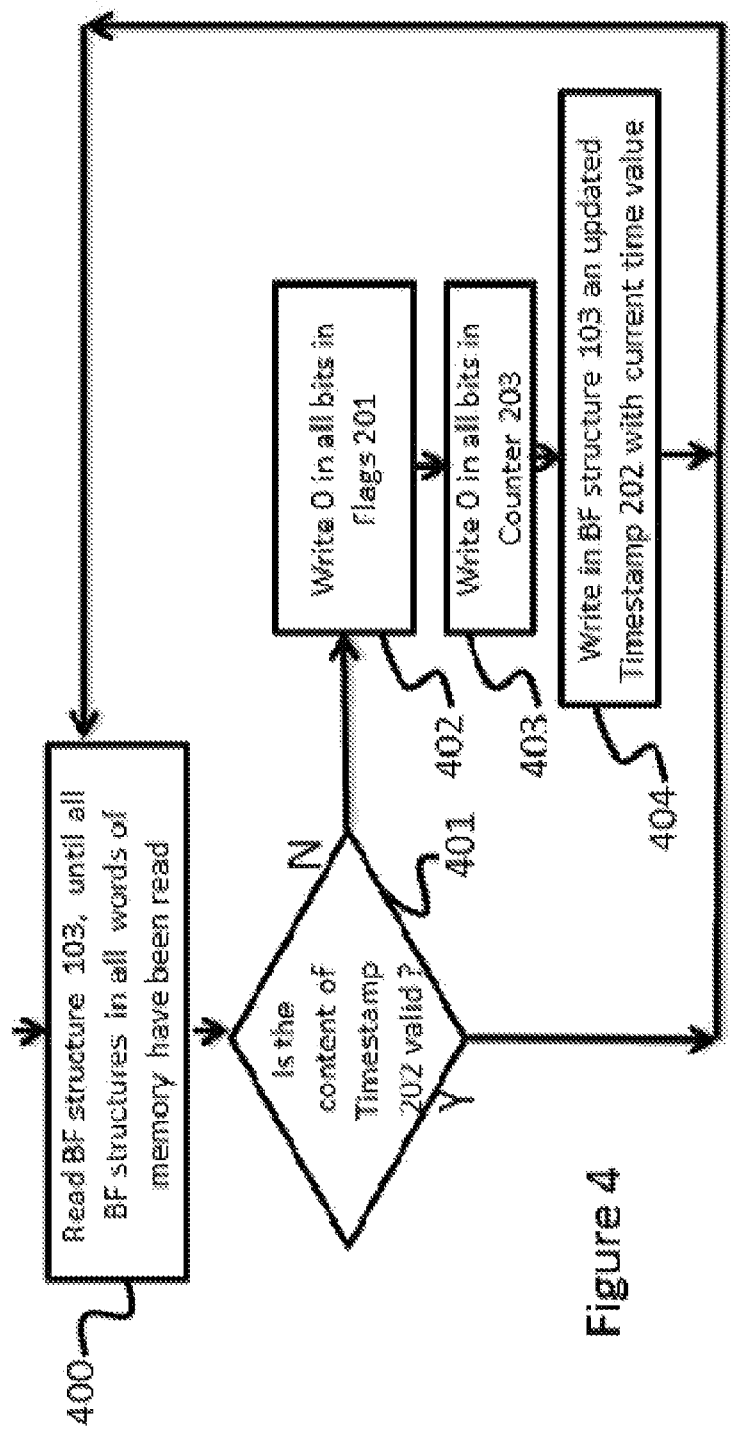
FIG. 4 depicts an optional parallel process of complete re-initialisation of the content of memory containing Bloom filter structures according to the present technology.

Turning to FIG. 4, at step 400, a BF structure 103 may be read in memory 101. At step 401, the Timestamp field 202 may be checked:
- if its content is invalid, as that notion is defined above, at step 402 a "0" may be written in all bits in the Flags field 201, at step 403 a "0" may be written in all bits of the Counter field 203 (ie: Counter field 203 may be reset to 0), and at step 404, the current time value ("absolute" time value modulo $2^M$) may be written in Timestamp 202; branch is then made back to step 400 with the next BF structure 103 in memory 101 being read;
- if at step 401, the Timestamp 202 content is valid, branch is then made back to step 400 with the next BF structure 103 in memory 101 being read.

This process is repeated until the content of Timestamp 202 for all BF structures 103 in memory 101 have been read and checked. It will be apparent to the person skilled in the art, that the re-initialization process described herein may take several time units before being completed for all BF structures 103 in memory 101, but that step 303 on FIG. 3 will ensure that no read BF structure may be used whilst the content of its Timestamp 202 is invalid (and also when the optional re-initialization process is not implemented).

Figure 5:
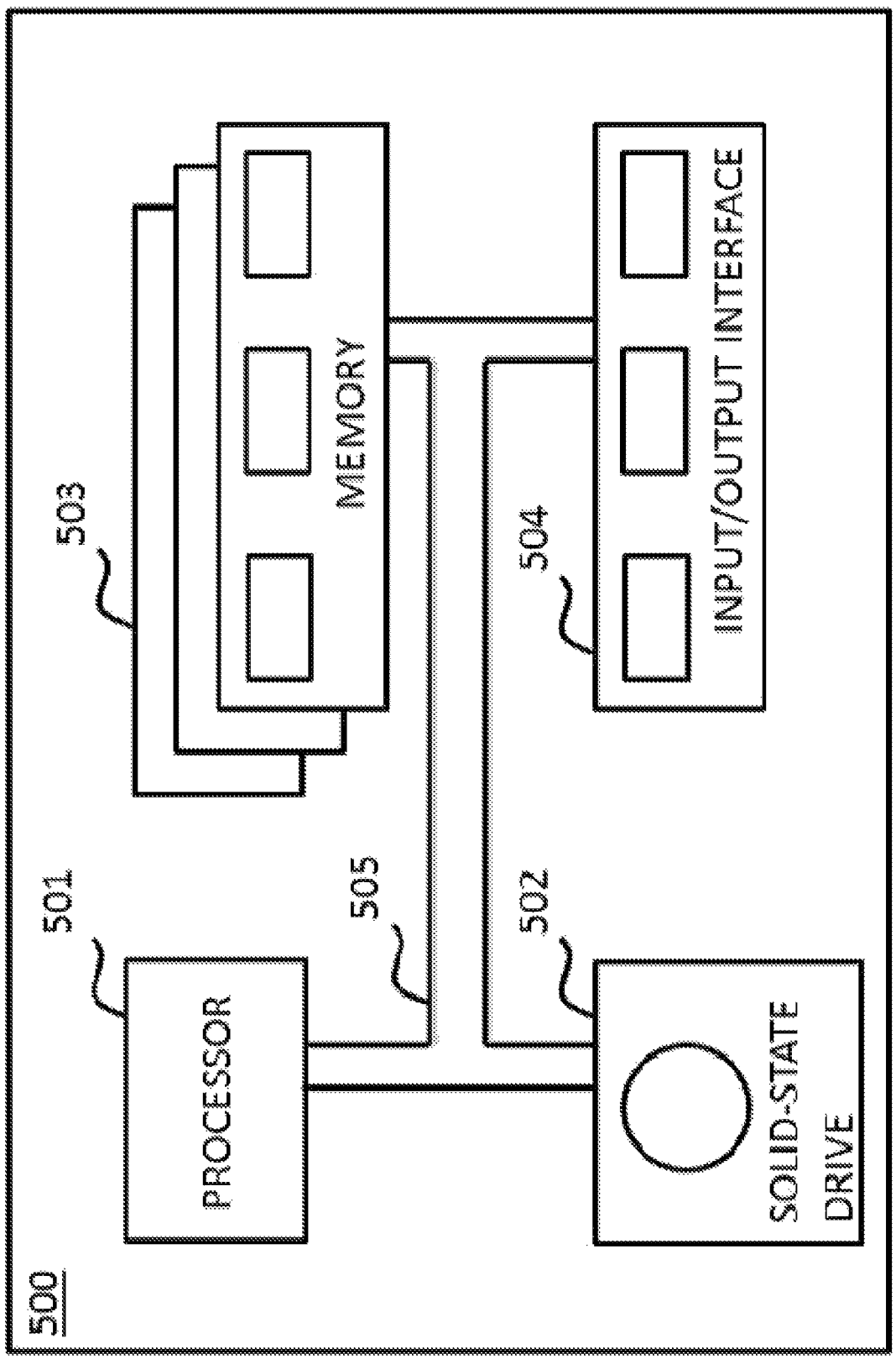
FIG. 5 depicts a computing system that may be used to implement the methods and processes according to the present technology.

The method and process steps described above may be implemented in a computing system, of which an example, without limitation, may be found in relation to FIG. 5. As will be appreciated by the person skilled in the art, such computing system may be implemented in any other suitable hardware, software, and/or firmware, or a combination thereof, and may be a single physical entity, or several separate physical entities with a distributed functionality.

In some aspects of the present technology, the computing system 500 may comprise various hardware components including one or more single or multi-core processors collectively represented by a processor 501, a solid-state drive 502, a memory 503 and an input/output interface 504. In this context, the processor 501 may or may not be included in a FPGA. In some other aspects, the computing system 500 may be an "off the shelf" generic computing system. In some aspects, the computing system 500 may also be distributed amongst multiple systems. The computing system 500 may also be specifically dedicated to the implementation of the present technology. As a person in the art of the present technology may appreciate, multiple variations as to how the computing system 500 is implemented may be envisioned without departing from the scope of the present technology.

Communication between the various components of the computing system 500 may be enabled by one or more internal and/or external buses 505 (e.g. a PCI bus, universal serial bus, IEEE 1394 "Firewire" bus, SCSI bus, Serial-ATA bus, ARINC bus, etc.), to which the various hardware components are electronically coupled.

The input/output interface 504 may allow enabling networking capabilities such as wire or wireless access. As an example, the input/output interface 504 may comprise a networking interface such as, but not limited to, a network port, a network socket, a network interface controller and the like. Multiple examples of how the networking interface may be implemented will become apparent to the person skilled in the art of the present technology. According to implementations of the present technology, the solid-state drive 502 may store program instructions, such as those part of, for example, a library, an application, etc. suitable for being loaded into the memory 503 and executed by the processor 501 for the method and process steps according to the present technology.

Figure 6:
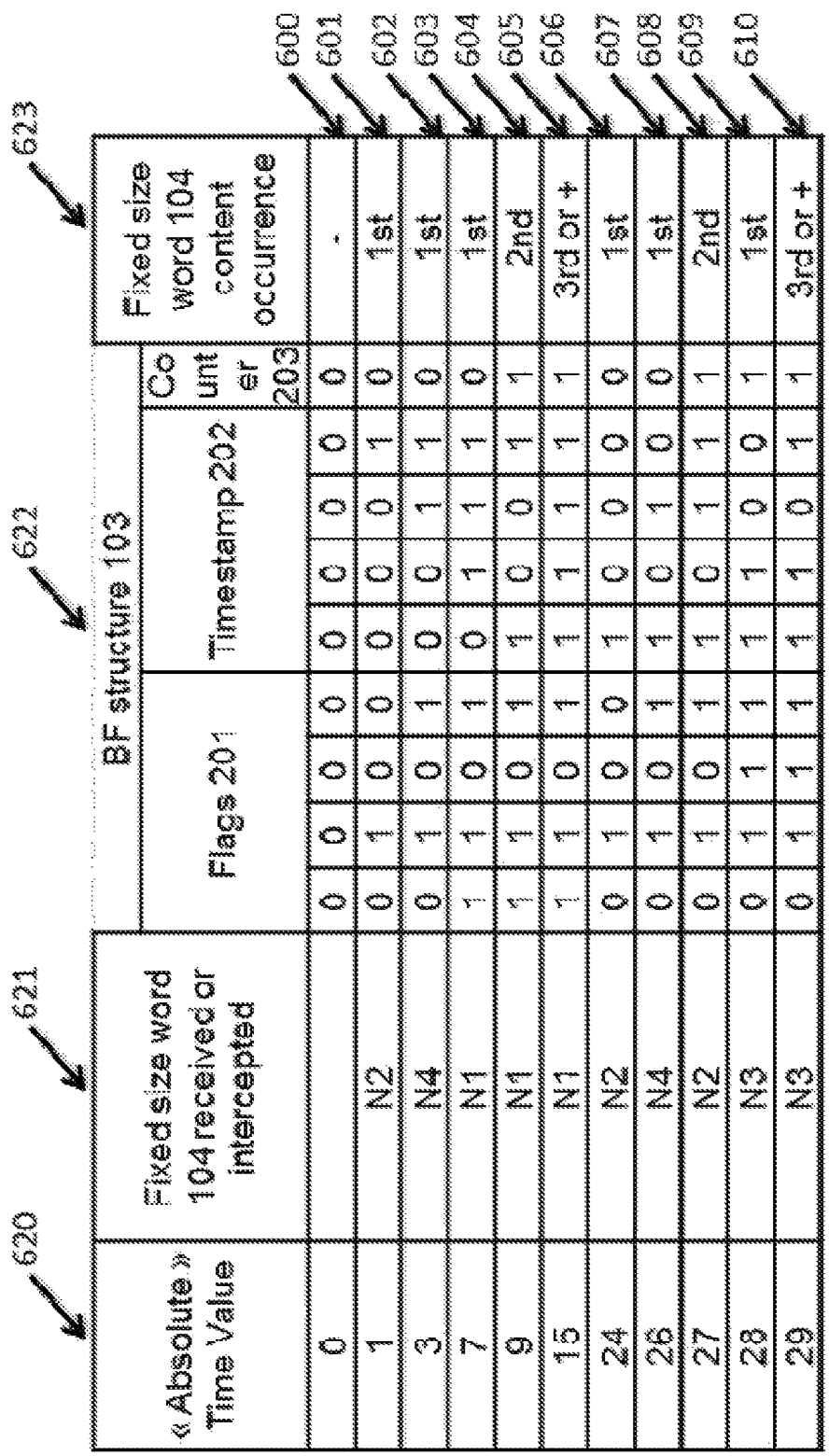
FIG. 6 illustrates the application of the present technology to an exemplary set of data packet/frames either received or intercepted.

FIG. 6 illustrates the application of the present technology to a simplified exemplary set of data packet/frames either received or intercepted, under the form of a table with rows 600-610 and columns 620-623. Values in column 620 are hypothetical «absolute» time values. Values in column 621 are hypothetical fixed-size words 104 received or intercepted, all pointing to one BF structure 103. Evolution of the BF structure 103 accordingly over time is depicted in column 622, for respectively fields Flags 201, Timestamp 202 and Counter 203 of the BF structure 103. Values in column 623 are comments about the occurrence information gathered from using the present technology. For simplification purposes of the description, the example is given in relation to the application of steps of FIG. 3, but not the optional parallel process of complete re-initialization of FIG. 4.

At row 600, the "absolute" time value is 0: all bits in BF structure 103 are set to 0. At row 601, the "absolute" time value is 1: the value of Timestamp 202 becomes "0001", and a fixed-size word 104 value N2 is received or intercepted: the value of Flags 201 becomes "0100" (the bit F2 is set to "1"), Counter 203 value remains at "0". This is a 1 occurrence of value N2. At row 602, the "absolute" time value is 3: the value of Timestamp 202 becomes "0011", and a fixed-size word 104 value N4 is received or intercepted: the value of Flags 201 becomes "0101" (the bit F4 is set to "1"), Counter 203 value remains at "0". At row 603, the "absolute" time value is 7: the value of Timestamp 202 becomes "0111", and a fixed-size word 104 value N1 is received or intercepted: the value of Flags 201 becomes "1101" (the bit F1 is set to "1"), Counter 203 value remains at "0". This is a 1 occurrence of value N1. At row 604, the "absolute" time value is 9: the value of Timestamp 202 becomes "1001", and a fixed-size word 104 value N1 is again received or intercepted: the value of Flags 201 remains "1101", Counter 203 value is set at "1". This is a $2^{nd}$ occurrence of value N1. At row 605, the "absolute" time value is 15: the value of Timestamp 202 becomes "1111", and a fixed-size word 104 value N1 is again received or intercepted: the value of Flags 201 remains "1101", Counter 203 value remains at "1". This is a $3^{rd}$ occurrence of value N1.

At row 606, the "absolute" time value is 24 and a fixed-size word 104 value N2 is again received or intercepted: the value of Timestamp 202 which has revolved around itself becomes "1000", and since this is not a valid Timestamp 202 anymore (assuming for example, as explained above, that a Timestamp 202 is valid only when the absolute value of the difference between the value of the Timestamp 202 and the "absolute" time value, is less than 8 ($2^{(M-1)}$)), the value of Flags 201 becomes "0100" (the bit F2 is set to "1" and all bits F1, F3 and F4 are set to "0"), and Counter 203 value is set at "0". This is a 1 occurrence of value N2, and not a 2nd occurrence (even though N2 was already received at "absolute" time value 1), since the Timestamp 202 is not valid. At row 607, the "absolute" time value is 26: the value of Timestamp 202 becomes "1010", and a fixed-size word 104 value N4 is received or intercepted: the value of Flags 201 becomes "0101" (the bit F4 is set to "1"), Counter 203 value remains at "0". This is a 1 occurrence of value N4, and not a $2^{nd}$ occurrence (even though N4 was already received at "absolute" time value 3), since the Timestamp 202 was not valid at row 606. At row 608, the "absolute" time value is 27: the value of Timestamp 202 becomes "1011", and a fixed-size word 104 value N2 is again received or intercepted: the value of Flags 201 remains "0101", Counter 203 value is set at "1". This is a $2^{nd}$ occurrence of value N2. At row 609, the "absolute" time value is 28: the value of Timestamp 202 becomes "1100", and a fixed-size word 104 value N3 is received or intercepted: the value of Flags 201 becomes "0111" (the bit F3 is set to "1"), Counter 203 remains at "1". This is $1^{st}$ occurrence of value N3. At row 610, the "absolute" time value is 29: the value of Timestamp 202 becomes "1101", and a fixed-size word 104 value N3 is again received or intercepted: the value of Flags 201 remains "0111", and since Counter 203 is at "1", this appears like a $3^{rd}$ occurrence of value N3, a false positive since N3 occurred two times only.

False positives are inherent to the Bloom filter technology, either adapted according to the present technology, or not, the acceptable rate of which depending on the application made of the technology. In an embodiment of the present technology, multiple adapted Bloom filter structures may be implemented, reducing the rate of false positives.

Figure 7:
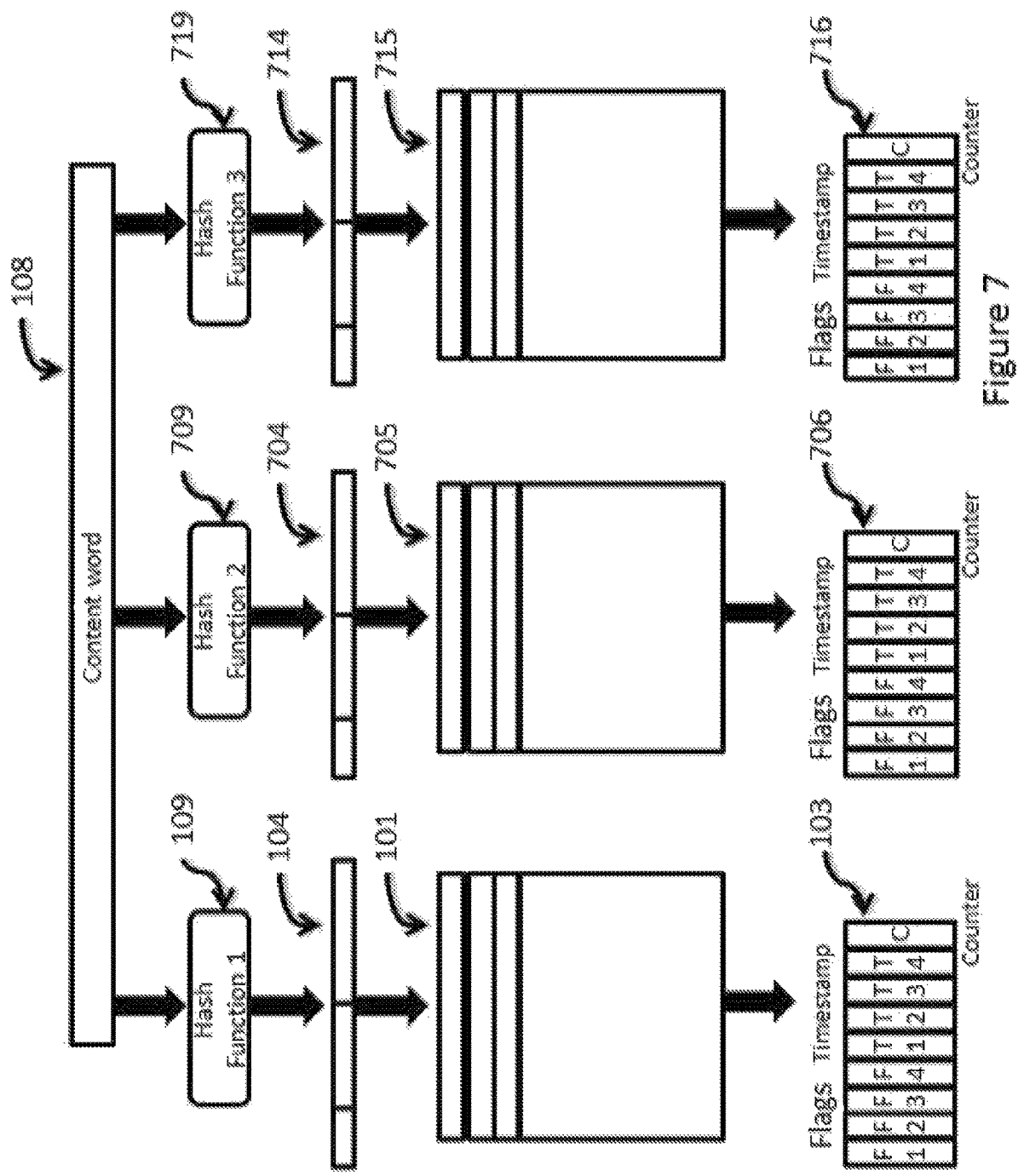
FIG. 7 depicts an embodiment of the present technology where multiple adapted Bloom filter structures are implemented.

FIG. 7 depicts an embodiment of the present technology where multiple adapted Bloom filter structures are implemented. Three structures are represented therein, but it will be apparent to the person skilled in the art that more or less of such structures may be implemented still based on the teachings of the present description. A content word 108 is to be handled, as mentioned in relation to FIG. 1. Three hash functions 109, 709, 719 may be used, as is known to the person skilled in the art, to map the content word 108 into fixed-size words 104, 704, 714 that may be used for indexing purposes. The hash functions may be different, or two or several of them may be identical.

Taking advantage of three memories 101, 705, 715 each comprising as an example $2^1$ words of 72 bits each, the fixed-size words 104, 704, 714 may be optimized to each include:

17 bits pointing to one of the $2^{17}$ words of respectively each of the memories 101, 705, 715;

3 bits pointing to one of 8 Bloom filter structures in a memory word of respectively each of the memories 101, 705, 715; and 2 bits pointing to one of 4 bits F1-F4 of a Flags field in respectively each of Bloom filter structures 103, 706, 716.

It will be apparent to the person skilled in the art that, in particular depending on the size (width and length) of the memories 101, 705, 715 available in a receiving communicating party or a mitigation networking piece of equipment, other sizes and composition of the fixed-size words 104, 704, 714 may be adapted and optimized, without affecting the generality of the teachings herein.

It will be equally apparent to the person skilled in the art that at any given point in time, Bloom filter structures 103, 706, 716 may not necessarily have the same content. The multiplicity of such Bloom filter structures, obtained with hash functions 109, 709, 719 giving rise to fixed-size words 104, 704, 714 of identical structure and pointing to memories 101, 705, 715 also of identical structure, allows to confer more robustness (ie: fewer false positives) to the present technology, for example in one of its possible applications as described herein, to keep track of a number of attempts and retries of sending or receiving data packet/frames with particular content.

Figure 8:
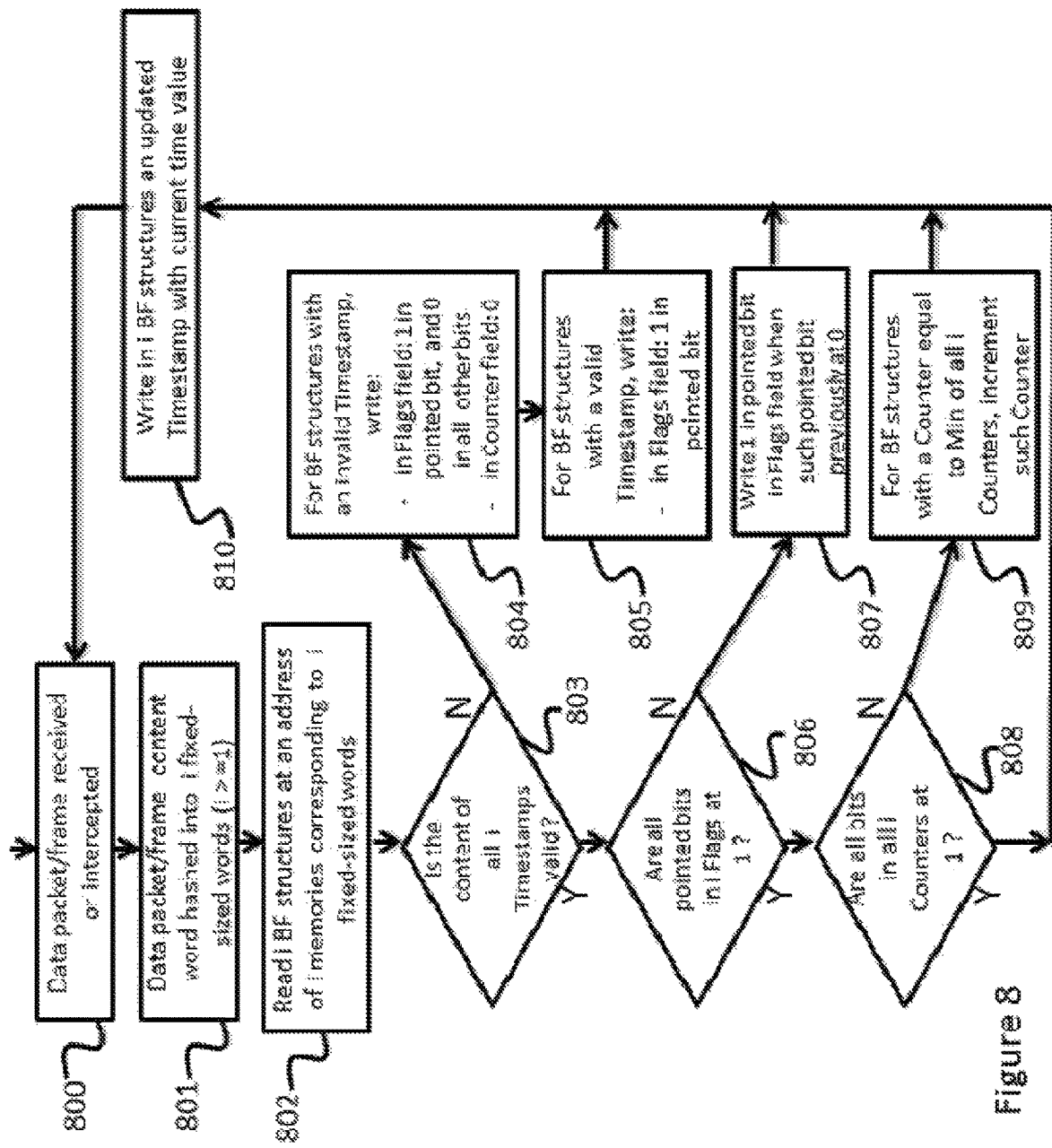
FIG. 8 depicts an application of multiple adapted Bloom filter structures according to the present technology, to the analysis of certain content of a data packet/frame either received or intercepted.

FIG. 8 depicts an application of multiple adapted Bloom filter structures according to the present technology, to the analysis of certain content of a data packet/frame either received or intercepted. The number of hash functions, fixed size words and memories, is generalized to be "i". The application may take the form of a method with steps 800 to 810. At step 800, a data packet/frame may be received or intercepted. At step 801, a content word of the data packet/frame may be hashed through i hash functions into i fixed size words, such as for example the 22-bit fixed size word 104 described above. At step 802, the fixed size words may be used to point to, and read/write, i BF structures, such as for example the BF structures 103, 706, 716 described above, in respectively i memories such as for example the memories 101, 705, 715 previously mentioned.

Once BF structures are being recovered from the memories, a number of read/write operations may occur on those BF structures as follows:

at step 803, the content of i Timestamp fields in i BF structures may be checked:

if at least one of the i contents is "invalid", as defined above, then at step 804, for all BF structures with an invalid Timestamp content, a "1" may be written in the pointed bit in the Flags field of such BF structures, and a "0" in all other bits, and a "0" may be written in all bits of the Counter field of such BF structures, whereas at step 805, for all BF structures with a valid Timestamp content, a "1" may be written in the pointed bit in the Flags field of such BF structures (leaving all other bits of such structures unchanged). For the i BF structures with valid or invalid Timestamp: at step 810, the current time value may be written in Timestamp of the i BF structures, and a next data packet/frame may be awaited at step 800. This case corresponds to a content of at least one of the BF structures being invalid, therefore the first occurrence of the fixed-size word obtained at step 801;

if at step 803, all i Timestamp contents are "valid", the i pointed bits in the i Flags fields of the i BF structures may be checked at step 806:

if any of the i pointed bits in the i Flags fields has a value of "0" (ie: the Min of all i pointed bits is not at "1"), then at step 807, a "1" may be written in any such pointed bits in the i Flags fields, at step 810, the current time value may be written in Timestamp of the i BF structures, and a next data packet/frame may be awaited at step 800. This case corresponds to a content of the BF structures that is valid, and the first occurrence of the data packet/frame content word, hashed into i fixed-size words obtained at step 801;

if at step 806, all of the i pointed bits in the i Flags fields have a value of "1" (ie: the Min of all i pointed bits is at "1"), then at step 808, the content of i Counters of i BF structures may be checked:

if any one of the bits in all i Counters has a value of "0" (ie: the Min of all bits in all i Counters is not at "1"), then at step 809 for all BF structures with a Counter that is equal to the Min all i Counters: the value of any such Counter may be incremented by "1", at step 810, the current time value may be written in Timestamp of the i BF structures, and a next data packet/frame may be awaited at step 800. This case corresponds to a content of the BF structures that is valid, and the subsequent occurrence of the data packet/frame content word, hashed into i fixed-size words obtained at step 801;

if at step 808, all bits in all i Counters have a value of "1" (ie: the Min of all bits of all i Counters is at "1"), then at step 810, the current time value may be written in Timestamp of the i BF structures, and a next data packet/frame may be awaited at step 800. This case corresponds to a content of the BF structures that is valid, and the (at least 3rd for a 1-bit Counter or $5^{th}$ for a 2-bit Counter for example) subsequent occurrence of the data packet/frame content word, hashed into i fixed-size words obtained at step 801.

It will be apparent to the person skilled in the art that if the i Counters comprise more than one bit, steps 808 and 809 may be adapted to check a number of occurrences beyond two of data packet/frame content word, hashed into i fixed-size words obtained at step 801.

It will be also apparent to the person skilled in the art, that the checking steps 803, 806, 808 are represented as sequential on FIG. 8 only for convenience of the description, and that such checking steps may be performed in parallel.

The optional parallel process of complete re-initialization of the content of memory containing Bloom filter structures, described in relation to FIG. 4, may also optionally be used in the application of multiple adapted Bloom filter structures as depicted FIG. 7 and FIG. 8. If used, it may also be used on certain only of the memories 101, 705, 715.

While the above-described implementations have been described and shown with reference to particular steps performed in a particular order, it will be understood that these steps may be combined, sub-divided, or re-ordered without departing from the teachings of the present description. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for handling a content word in a system comprising i (i>=1) memories of $2^N$ memory words of R bits each, wher R is a positive integer value, and wherein:

each memory word comprises at least $2^S$ Bloom Filter (BF) structures;

each BF structure comprises Floor($R/2^S$) bits of which P bits define a Flags field, M bits define a Timestamp field, Q bits define a Counter field, such that P+M+Q=Floor($R/2^S$) and P is a power of 2 and M and Q are positive integer values; and an absolute time value has increments of time units, and a current time value is the absolute time value modulo $2^M$;

the method comprising:

a) receiving the content word;

b) hashing the content word into i fixed-size words, each comprising 3 fields $A_i$, $B_i$, $C_i$, of respectively N, S and square root(P) bits;

c) pointing to i memory words, corresponding respectively to $A_i$;

d) pointing to, and reading, i BF structures respectively in the i pointed memory words, corresponding respectively to $B_i$;

e) checking whether all i pointed and read BF structures have a valid Timestamp field, and if not:

for BF structures among the i pointed and read BF structures having an invalid Timestamp field: writing a "1" in a bit of the Flags field corresponding to $C_i$, writing a "0" in all other bits of the Flags field, and resetting to "0" the Counter field; and for BF structures among the i pointed and read BF structures having a valid Timestamp field: writing a "1" in a bit of the Flags field corresponding to $C_i$; and for all BF structures among the i pointed and read BF structures: updating the Timestamp field with the current time value, and going to step a);

f) checking whether all bits of the Flags field in all i pointed and read BF structures are at "1", and if not:

writing a "1" in the bit of the Flags field corresponding to $C_i$; and for all BF structures among the i pointed and read BF structures: updating the Timestamp field with the current time value, and going to step a);

g) checking whether all bits in Counter fields in all i pointed and read BF structures are at "1", and if not:

for BF structures among the i pointed and read BF structures having a Counter field equal to the Min of Counter fields in the i pointed and read BF structures: incrementing by one the value of the Counter field; and for all BF structures among the i pointed and read BF structures: updating the Timestamp field with the current time value, and going to step a); and h) for all BF structures among the i pointed and read BF structures: updating the Timestamp field with the current time value, and going to step a).

2. The method of claim 1, further comprising reading all the BF structures in all memory words of at least one of the i memories, and for each such read BF structure, checking whether the content of the Timestamp field is valid, and if not: writing a "0" in all bits of the Flags field; resetting to "0" the Counter field; and updating the Timestamp field with the current time value.

3. The method of claim 1, wherein the content word is a concatenation of addresses including Internet Protocol source and destination addresses.

4. The method of claim 1, wherein each BF structure comprises 4 bits for the Flags field, 4 bits for the Timestamp field, and 1 bit for the Counter field.

5. The method claim 1, wherein a Timestamp field is valid when the absolute value of the difference between the value of the Timestamp field and the current time value is less than a predetermined value.

6. The method of claim 5, wherein the predetermined value is $2^{(M-1)}$.

7. The method of claim 2, wherein method steps are performed at a period of time equal to or less than $2^{(M-1)}$ time units.

8. The method of claim 1, wherein i is greater than or equal to 3 and at least two of the i fixed-size words are identical.

9. A system for handling a content word comprising at least one processor and i (i>=1) memories of $2^N$ memory words of R bits each, where R is a positive integer value wherein:

each memory word comprises at least $2^S$ BF structures;
each BF structure comprises Floor(R/$2^S$) bits of which P bits define a Flags field, M bits define a Timestamp field, Q bits define a Counter field, such that P+M+Q=Floor(R/$2^S$): where P is a power of 2 and M and Q are positive integer values and
an absolute time value has increments of time units, and a current time value is the absolute time value modulo $2^M$;
the system being configured to:
receive the content word;
hash the content word into i fixed-size words, each comprising 3 fields $A_i$, $B_i$, $C_i$, of respectively N, S and square root(P) bits;
point to i memory words, corresponding respectively to $A_i$;
point to, and read, i BF structures respectively in the i pointed memory words, corresponding respectively to $B_i$;

check whether all i pointed and read BF structures have a valid Timestamp field, and if not:
for BF structures among the i pointed and read BF structures having an invalid Timestamp field: write a "1" in a bit of the Flags field corresponding to $C_i$, write a "0" in all other bits of the Flags field, and reset to "0" the Counter field; and for BF structures among the i pointed and read BF structures having a valid Timestamp field: write a "1" in a bit of the Flags field corresponding to $C_i$; and
for all BF structures among the i pointed and read BF structures: update the Timestamp field with the current time value;
check whether all bits of the Flags field in all i pointed and read BF structures are at "1", and if not:
write a "1" in the bit of the Flags field corresponding to $C_i$; and
for all BF structures among the i pointed and read BF structures: update the Timestamp field with the current time value;
check whether all bits in Counter fields in all i pointed and read BF structures are at "1", and if not:
for BF structures among the i pointed and read BF structures having a Counter field equal to the Min of Counter fields in the i pointed and read BF structures: increment by one the value of the Counter field; and
for all BF structures among the i pointed and read BF structures: update the Timestamp field with the current time value.

10. The system of claim 9, wherein the at least one processor is further configured to read all the BF structures in all memory words of at least one of the i memories, and for each such read BF structure, check whether the content of the Timestamp field is valid, and if not: write a "0" in all bits of the Flags field; reset to "0" the Counter field; and update the Timestamp field with the current time value.

11. The system of claim 9, wherein the content word is a portion of a data packet/frame exchanged between two communicating devices, and is intercepted so as to determine whether an identical content word has been exchanged between the two communicating devices over a sliding window of absolute time.

12. The system of claim 9, wherein the i memories are Quad Data Rate SRAMs.

* * * * *

UNITED STATES PATENT AND TRADEMARK OFFICE
CERTIFICATE OF CORRECTION

| | | |
|---|---|---|
| PATENT NO. | : 11,743,186 B2 | Page 1 of 1 |
| APPLICATION NO. | : 16/995915 | |
| DATED | : August 29, 2023 | |
| INVENTOR(S) | : Clement Rousseau et al. | |

It is certified that error appears in the above-identified patent and that said Letters Patent is hereby corrected as shown below:

In the Claims

Column 16, Claim 1, Line 13 should read --each, where R is a positive integer value, and wherein:--

Column 17, Claim 5, Line 12 should read --The method of claim 1, wherein a Timestamp field is valid--

Column 17, Claim 9, Lines 31-32 should read --where P is a power of 2--

Column 17, Claim 9, Line 37 should read --the at least one processor configured to:--

Signed and Sealed this
Fifth Day of March, 2024

Katherine Kelly Vidal
*Director of the United States Patent and Trademark Office*